(12) United States Patent
Nevin et al.

(10) Patent No.: US 8,447,461 B2
(45) Date of Patent: May 21, 2013

(54) PARTICULATE FILTER ASH LOADING PREDICTION METHOD AND VEHICLE WITH SAME

(75) Inventors: Ryan Nevin, Waterloo, IA (US);
Antonio Triana, Waterloo, IA (US);
Danan Dou, Cedar Falls, IA (US);
Taner Tuken, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 134 days.

(21) Appl. No.: 12/896,075

(22) Filed: Oct. 1, 2010

(65) Prior Publication Data

US 2012/0083965 A1  Apr. 5, 2012

(51) Int. Cl.
*B01D 41/00* (2006.01)

(52) U.S. Cl.
USPC ........... 701/29.4; 701/29.1; 701/101; 60/274; 60/286; 60/295

(58) Field of Classification Search
USPC .................. 701/29.1, 29.4, 101; 60/274, 286, 60/295
See application file for complete search history.

(56) References Cited

U.S. PATENT DOCUMENTS

| | | | | |
|---|---|---|---|---|
| 5,067,973 A | * | 11/1991 | Pattas | 95/12 |
| 5,157,340 A | * | 10/1992 | Walton et al. | 324/641 |
| 5,497,099 A | * | 3/1996 | Walton | 324/641 |
| 6,622,480 B2 | * | 9/2003 | Tashiro et al. | 60/295 |
| 6,928,809 B2 | | 8/2005 | Inoue et al. | |
| 6,952,918 B2 | * | 10/2005 | Imai et al. | 60/295 |
| 6,964,694 B2 | * | 11/2005 | Rauchfuss et al. | 95/1 |
| 7,140,176 B2 | * | 11/2006 | Bartsch et al. | 60/276 |
| 7,157,919 B1 | * | 1/2007 | Walton | 324/641 |
| 7,188,512 B1 | | 3/2007 | Wills | |
| 7,231,291 B2 | | 6/2007 | Dollmeyer et al. | |
| 7,243,489 B2 | | 7/2007 | Johnson et al. | |
| 7,263,825 B1 | * | 9/2007 | Wills et al. | 60/295 |
| 7,281,369 B2 | * | 10/2007 | Emi et al. | 60/297 |
| 7,658,064 B2 | * | 2/2010 | Konstandopoulos | 60/297 |
| 7,841,172 B2 | * | 11/2010 | Scaife et al. | 60/297 |
| 7,866,146 B2 | * | 1/2011 | Konstandopoulos | 60/311 |
| 7,891,176 B2 | * | 2/2011 | Konstandopoulos | 60/297 |
| 8,069,658 B2 | * | 12/2011 | He et al. | 60/295 |
| 2005/0150214 A1 | | 7/2005 | Crawley et al. | |
| 2005/0150218 A1 | | 7/2005 | Crawley et al. | |
| 2007/0006577 A1 | | 1/2007 | Yokoyama et al. | |
| 2007/0056270 A1 | | 3/2007 | Liimatta et al. | |
| 2007/0056272 A1 | | 3/2007 | Dollmeyer et al. | |
| 2007/0056274 A1 | | 3/2007 | Wills | |
| 2007/0068147 A1 | * | 3/2007 | Sun et al. | 60/297 |

(Continued)

OTHER PUBLICATIONS

Don Newburry, Diesel Particulates: What They Are & What Stationary Engine Operators Can Do to Comply With New Regulations, pp. 1-13.

*Primary Examiner* — Thomas Black
*Assistant Examiner* — Peter D Nolan
(74) *Attorney, Agent, or Firm* — Taylor IP, P.C.

(57) ABSTRACT

A particulate filter (PF) ash loading prediction method includes the steps of: regenerating the PF using a first soot loading prediction model or a second soot loading prediction model; determining whether the regeneration of the PF was initiated by the first soot loading prediction model or the second soot loading prediction model; incrementing a first counter associated with the first soot loading prediction model or a second counter associated with the second soot loading prediction model, dependent on the determining step; comparing a ratio of the first counter and the second counter; and establishing whether the PF requires servicing, dependent on the ratio.

18 Claims, 2 Drawing Sheets

U.S. PATENT DOCUMENTS

| | | |
|---|---|---|
| 2007/0209333 A1 | 9/2007 | Kondou |
| 2007/0251214 A1 | 11/2007 | Nishino et al. |
| 2008/0087007 A1* | 4/2008 | Konstandopoulos ........... 60/286 |
| 2008/0196389 A1* | 8/2008 | Stroia et al. ...................... 60/274 |
| 2008/0282682 A1* | 11/2008 | C. et al. ........................... 60/291 |
| 2009/0056288 A1* | 3/2009 | Waldo ............................. 55/294 |
| 2009/0056312 A1 | 3/2009 | Wills |
| 2009/0241520 A1* | 10/2009 | Gendron et al. ................. 60/295 |
| 2009/0308052 A1* | 12/2009 | Zhang et al. ..................... 60/274 |
| 2010/0101213 A1* | 4/2010 | Tuomivaara et al. ........... 60/276 |
| 2010/0126144 A1* | 5/2010 | He et al. .......................... 60/286 |
| 2010/0229538 A1* | 9/2010 | Bloms et al. .................... 60/295 |
| 2011/0120088 A1* | 5/2011 | George et al. ................... 60/274 |
| 2012/0011829 A1* | 1/2012 | Taibi et al. ...................... 60/274 |

* cited by examiner

PARTICULATE FILTER ASH LOADING PREDICTION METHOD AND VEHICLE WITH SAME

FIELD OF THE INVENTION

The present invention relates to the field of internal combustion engines, and, more particularly, to internal combustion engines having exhaust aftertreatment devices.

BACKGROUND OF THE INVENTION

Internal combustion engines come in a number of forms, the most common of which are spark-ignited gasoline fueled engines and compression-ignition, diesel-fueled engines. The compression-ignition, or diesel-type engine is used in many commercial and industrial power applications because its durability and fuel economy are superior to the spark-ignited gasoline-fueled engines. A diesel engine utilizes the heat of the compression of the intake air, into which a timed and metered quantity of fuel is injected, to produce combustion. The nature of the diesel engine cycle is that it has a variable air-fuel ratio that can, under partial power conditions, rise to levels significantly above stoichiometric. This results in enhanced fuel economy since only the quantity of fuel needed for a particular power level is supplied to the engine.

One of the issues with a diesel-type engine is the impact on emissions. In addition to the generation of carbon monoxide and nitrous oxide, there is a generation of particulates in the form of soot. A number of approaches are employed to reduce particulates while, at the same time, reducing oxides of nitrogen to ever more stringent levels as mandated by government regulations. Stoichiometric engines have been proposed to achieve this balance since they enable the use of an automotive type catalyst to reduce oxides of nitrogen. By operating the engine at or near stoichiometric conditions, a three-way catalyst may be utilized. However, operation in this manner causes a substantial increase in diesel particulates. Accordingly, a particulate filter (PF) in the form of a diesel particulate filter (DPF) must be employed to filter out the particulates, but the generation of particulates in a significant amount require that frequent regeneration of the filters, through temporary heating or other means, is necessary to remove the collected particulate matter. A wall-flow DPF will often remove 85% or more of the soot during operation. Cleaning the DPF includes utilizing a method to burn off the accumulated particulate either through the use of a catalyst or through an active technology, such as a fuel-burner, which heats the DPF to a level in which the soot will combust. This may be accomplished by an engine modification which causes the exhaust gasses to rise to the appropriate temperature. This, or other methods, known as filter regeneration, is utilized repeatedly over the life of the filter. One item that limits the life of the DPF is an accumulation of ash therein that will cause the filter to require replacement or some other servicing, such as a cleaning method, to remove the accumulated ash. The accumulated ash causes a reduction in the efficiency of the DPF and causes increased back pressure in the exhaust system of the diesel engine system.

U.S. Patent Application Pub. No. US 2007/0251214 discloses an apparatus for detecting a state of a DPF with a differential pressure sensor. An electronic control unit estimates an amount of ash remaining in the DPF based on the output of the differential pressure sensor immediately after the regeneration process. Alternatively, the residue ash amount may be calculated based on the difference between a ratio of the variation rate of the input manifold pressure with the variation rate of the differential pressure immediately after the regeneration process and an equivalent ratio regarding a thoroughly new or almost new diesel particulate filter. The residue ash amount is calculated every time a regeneration process is carried out and stored in memory. This method is problematic since the backpressure assessment after regeneration can be misleading if the soot has not been entirely removed and since the backpressure due to the ash accumulation measured after each regeneration can vary leading to misleading assumptions about the ash content.

U.S. Pat. No. 6,622,480 discloses a DPF unit and regeneration control method that adjusts the start timing of a regeneration operation. The method includes an estimate of the ash accumulated quantity that is in the exhaust gas and accumulated in the filter and the correction of the exhaust pressure judgment value for judging the regeneration operation start based on the ash accumulated estimation value. The ash quantity is determined from the quantity of lubricant oil consumed according to the engine operation state. The effective accumulation in the filter with ash is reflected in the judgment of regeneration start timing because the exhaust pressure judgment value to be used for judging the regeneration operation start is corrected with the ash accumulation estimation value. The use of oil consumption is problematic since the lubricant oil may be consumed in ways other than being combusted. Further, even if the oil is not combusted, it is not necessarily passed through the DPF.

It is also possible that direct-injected gasoline engines may require the use of a PF in the future, as a result of ever increasing governmental emissions standards.

What is needed in the art is a system that maximizes the life of a PF, such as a DPF, while ensuring that the regeneration process is done in an efficient, economical manner.

SUMMARY

The invention in one form is directed to a PF ash loading prediction method, including the steps of: regenerating the PF using a first soot loading prediction model or a second soot loading prediction model; determining whether the regeneration of the PF was initiated by the first soot loading prediction model or the second soot loading prediction model; incrementing a first counter associated with the first soot loading prediction model or a second counter associated with the second soot loading prediction model, dependent on the determining step; comparing a ratio of the first counter and the second counter; and establishing whether the PF requires servicing, dependent on the ratio.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION

Figure 1:
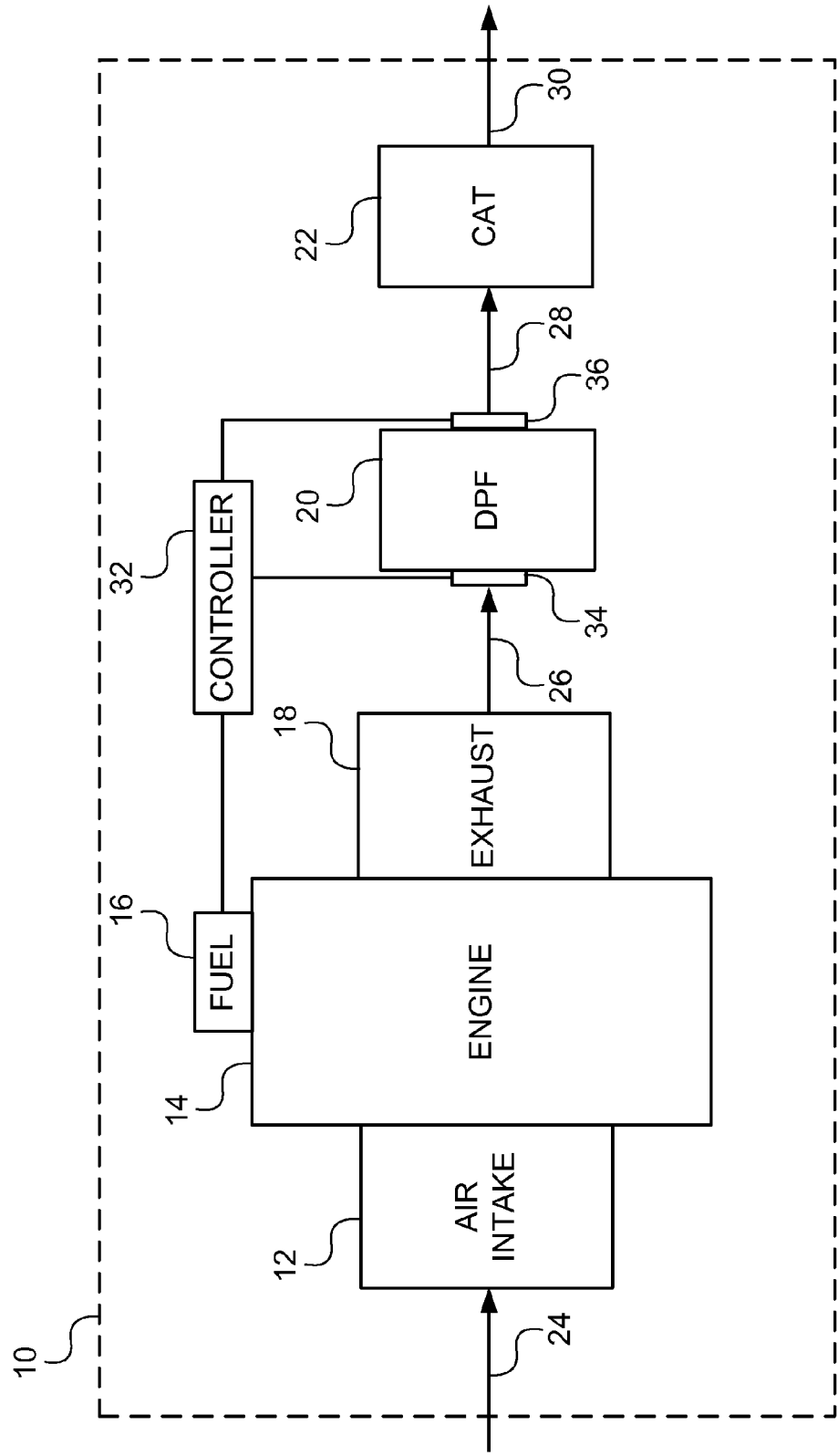
FIG. 1 is a schematic drawing of a vehicle with an internal combustion engine employing an embodiment of an ash loading prediction method of the present invention.

Referring now to the drawings, and more particularly to FIG. 1, there is shown a vehicle 10, which may be a work vehicle such as an agricultural work vehicle, construction type vehicle or forestry type vehicle, utilizing an engine system that includes an air intake 12, an engine 14, a fuel supply system 16 (labeled FUEL), and an exhaust system 18 (labeled EXHAUST). Engine 14 has at least one piston reciprocating within an engine block that is connected to a crankshaft for producing a rotary output (not shown). Each piston is movable within a variable volume cylinder (not shown). The products of combustion pass through exhaust system 18.

The engine system additionally includes a PF in the form of DPF 20 and a catalyst (CAT) 22. Although the embodiment of the invention illustrated in the drawings and described herein is with reference to a diesel engine having a DPF, it is understood that the present invention can likewise apply to other types of engines using a PF, such as a direct-injected gasoline engine, etc. An air intake flow 24 passes into engine 14 for the purposes of combustion, having an exhaust flow 26 that passes through DPF 20 and a gas flow 28 that continues through CAT 22 and is exhausted in the form of gas flow 30 to the environment. DPF 20 and CAT 22 may be combined into one unit, or CAT 22 may be positioned at a different location or omitted from the engine system. A controller 32 interacts with sensors 34 and 36 as well as fuel supply system 16 to control the flow of fuel and to sense the pressure drop across DPF 20. DPF 20 may be regenerated as directed by controller 32 with input of the sensors 34 and 36, each of which provide pressure readings so that the pressure drop across DPF 20 can be calculated by controller 32 based on the difference in pressure measurements between sensors 34 and 36. Controller 32 provides input to fuel supply system 16, which may cause engine 14 to change the exhaust temperature flowing through exhaust system 18 to DPF 20, causing a regeneration of DPF 20.

DPF 20 may be in the form of a wall-flow filter that traps soot with a very high efficiency, even above 90%. When the soot cake layer has been established within DPF 20, filling the inlet channel walls, the pressure increases across DPF 20 and a soot trapping efficiency of higher than 99% may be achieved. It is common to measure a pressure drop across DPF 20 through the use of a delta pressure sensor, which may include two sensors, such as those illustrated in FIG. 1 as sensors 34 and 36. The readings from sensors 34 and 36 are used to predict soot loading of DPF 20. These predictions can be made with models, such as those developed by Konstandopoulos, et al., described in SAE standard 2002-01-1015. A high filtration efficiency DPF 20 also traps ash, which can come from high ash lube oil, excessive oil consumption, and high ash fuels, such as biodiesel. As ash gradually accumulates in DPF 20, the DPF 20 delta pressure signal received by controller 32 at a given soot level will be higher. This behavior is due to ash occupying space in the inlet channels of DPF 20, leaving less surface/volume for soot distribution.

Figure 2:
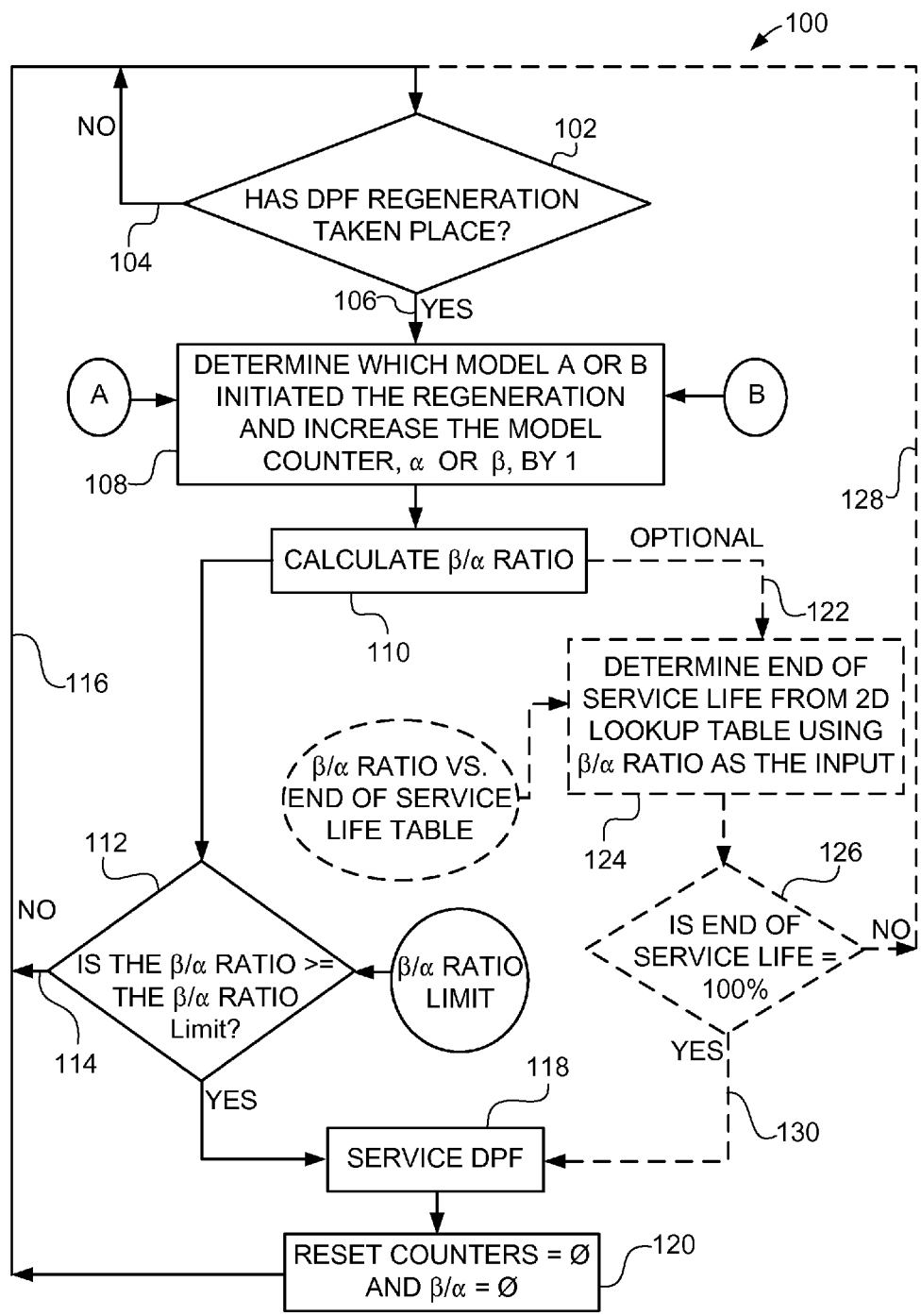
FIG. 2 depicts a schematical representation of the method utilized in the vehicle of FIG. 1.

Now, additionally referring to FIG. 2, there is shown an ash loading prediction method 100 utilized within controller 32, which may be interconnected to other sensors and control systems. Controller 32 may have other functions unrelated or indirectly related to the functions of method 100 of the present invention.

During operation, a loop state occurs in which it is determined if DPF 20 requires regeneration as a result of soot buildup (decision block 102 and line 104). With the present invention, the regeneration of DPF 20 may be initiated by one of two different soot loading prediction models. Using two different soot loading prediction models, any discrepancies between the models can be attributed to an ash loading increase within DPF 20. The first soot loading prediction model "A" utilizes a pressure differential across DPF 20, as measured by sensors 34 and 36. The pressure signals are used to determine soot loading with the Konstandopoulos, et al. derived equations as described above, and further described in SAE standard 2002-01-1015.

The second soot loading prediction model "B" may be any one of a number of soot loading prediction models, not based on a measured pressure differential across DPF 20. For example, the second soot loading prediction model "B" may be a time based counter which triggers a regeneration of DPF 20 based upon hours of engine operation; an open loop soot loading prediction model using lookup tables based on engine parameters such as engine speed, engine load, etc; a soot loading prediction model using multiple input linear regression equations with a physics and/or chemistry based model; or a linearly regressed multiple input soot loading model using six sigma practices. Other soot loading models which are not based on a measured pressure differential across DPF 20 may also be possible.

When a regeneration of DPF 20 occurs (line 106), then a determination is made as to whether first soot loading prediction model "A" or second soot loading prediction model "B" initiated the regeneration of DPF 20 (block 108). If the first soot loading prediction model "A" initiated the regeneration, then a counter $\alpha$ associated with the first soot loading prediction model "A" is incremented by a value of one (1). Likewise, if the second soot loading prediction model "B" initiated the regeneration, then a counter $\beta$ associated with the second soot loading prediction model "B" is incremented by a value of one (1).

At block 110, the ratio $\beta/\alpha$ is calculated using the values of the counters $\beta$ and $\alpha$. As ash loading within DPF 20 increases over time, more regenerations of DPF 20 occur based on the delta pressure based soot loading, causing the delta pressure regeneration counter $\alpha$ to increase in the denominator, and the $\beta/\alpha$ ratio to further decrease below one (1).

At decision block 112, the value of the ratio $\beta/\alpha$ is compared with the value of a predefined $\beta/\alpha$ ratio limit (i.e., threshold value). If the actual ratio $\beta/\alpha$ is greater than or equal to the value of the $\beta/\alpha$ ratio limit, then servicing of the DPF 20 is not required and the method logic returns via lines 114 and 116 to the input of decision block 102. On the other hand, if the actual ratio $\beta/\alpha$ is less than the value of the $\beta/\alpha$ ratio limit, then servicing of the DPF 20 is required (block 118). After servicing, which may include cleaning or replacement of DPF 20, then the counters $\beta$ and $\alpha$ are reset to zero (0), and the ratio $\beta/\alpha$ is reset to zero (0) (block 120). The method logic then returns via line 116 to the input of decision block 102.

An optional method of using the ratio $\beta/\alpha$ to determine whether servicing of DPF 20 is required is illustrated along line 122 from block 110. More particularly, the ratio $\beta/\alpha$ may be used as an input value to a lookup table, for example a two-dimensional lookup table, to determine an end of service life for DPF 20 (block 124). The ratio $\beta/\alpha$ lies along the horizontal or ordinate axis of the lookup table, and the percent of service life (or end of service life) lies along the vertical or abscissa axis of the lookup table. If the ratio $\beta/\alpha$ does not correspond to an end of service life condition (decision block 126), then the method logic returns via line 128 to the input of decision block 102. On the other hand, if the ratio $\beta/\alpha$ does correspond to and end of service life condition, then the method logic proceeds via line 130 to blocks 118 and 120, as described above.

Overall, ash accumulation is generally a slow process. Total exhaust system back pressure due to ash starts to become noticeable above 2,500 hours of engine operation for greater than 130 kilowatt applications, and above 1,500 hours of operation for less than 130 kilowatt applications. However, in addition to the effect on engine performance due to higher back pressure, the delta pressure sensor readings increase as a result of the ash loading. Without any compensation for ash loading, the time interval between regenerations starts to decrease since the aftertreatment control system will determine that a DPF 20 regeneration needs to occur based on delta pressure readings.

It is known that ash loading of DPF 20 will cause higher delta pressure readings across DPF 20 to become progressively higher with soot loading and that such effects cannot be remedied by merely averaging. Also, ash accumulation can take a significant amount of engine operation time to show substantial effects on DPF delta pressure signals and exhaust back pressures.

Advantageously, the present invention provides a statistically based ash model to monitor and verify the ash prediction that is not based on operation hours or fuel consumption history, as utilized in prior art systems. Further, the method is also capable of flagging excessive oil consumption or poor fuel quality that results in excessive loading of DPF 20. Additionally, the present invention reduces the number of DPF regenerations when the DPF 20 is approaching the end-of-service life. The method can also generate an input for a monitor after determining that an ash service warning or engine degradation is occurring or may occur. Yet further, the present invention can compensate for the use of biodiesel, which has a tendency to create additional ash over petroleum based diesel.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A particulate filter (PF) ash loading prediction method, comprising the steps of:
    regenerating the PF using a first soot loading prediction model or a second soot loading prediction model;
    determining whether the regeneration of the PF was initiated by the first soot loading prediction model or the second soot loading prediction model;
    incrementing a first counter associated with said first soot loading prediction model or a second counter associated with said second soot loading prediction model, dependent on said determining step;
    comparing a ratio of said first counter and said second counter; and
    establishing whether said PF requires servicing, dependent on said ratio.

2. The ash loading prediction method of claim 1, wherein said establishing step includes comparing said ratio with a value of a limit assigned to said ratio.

3. The ash loading prediction method of claim 1, wherein said incrementing step includes incrementing said first counter or said second counter by a value of one (1).

4. The ash loading prediction method of claim 1, wherein said establishing step includes using said ratio as in input value to a lookup table.

5. The ash loading prediction method of claim 4, wherein said lookup table is a two-dimensional lookup table.

6. The ash loading prediction method of claim 1, wherein said servicing of said PF includes replacing said PF.

7. The ash loading prediction method of claim 1, wherein said first soot loading prediction model utilizes a pressure differential across said PF.

8. The ash loading prediction method of claim 7, wherein said first soot loading prediction model utilizes equations from standard SAE 2002-01-1015.

9. The ash loading prediction method of claim 1, wherein said second soot loading prediction model is not based upon a pressure differential across said PF.

10. A vehicle, comprising:
    an internal combustion engine;
    a particulate filter (PF) connected to said internal combustion engine;
    a controller operatively connected to said internal combustion engine and to said particulate filter, said controller being configured to execute the steps of a method, the method including the steps of:
    regenerating the PF using a first soot loading prediction model or a second soot loading prediction model;
    determining whether the regeneration of the PF was initiated by the first soot loading prediction model or the second soot loading prediction model;
    incrementing a first counter associated with said first soot loading prediction model or a second counter associated with said second soot loading prediction model, dependent on said determining step;
    comparing a ratio of said first counter and said second counter; and
    establishing whether said PF requires servicing, dependent on said ratio.

11. The vehicle of claim 10, wherein said establishing step includes comparing said ratio with a value of a limit assigned to said ratio.

12. The vehicle of claim 10, wherein said incrementing step includes incrementing said first counter or said second counter by a value of one (1).

13. The vehicle of claim 10, wherein said establishing step includes using said ratio as in input value to a lookup table.

14. The vehicle of claim 13, wherein said lookup table is a two-dimensional lookup table.

15. The vehicle of claim 10, wherein said servicing of said PF includes replacing said PF.

16. The vehicle of claim 10, wherein said first soot loading prediction model utilizes a pressure differential across said PF.

17. The vehicle of claim 16, wherein said first soot loading prediction model utilizes equations from standard SAE 2002-01-1015.

18. The vehicle of claim 10, wherein said second soot loading prediction model is not based upon a pressure differential across said PF.

* * * * *